(12) United States Patent
Burmester et al.

(10) Patent No.: US 8,459,294 B2
(45) Date of Patent: Jun. 11, 2013

(54) DOUBLE-SEAT VALVE, THE SEATS OF WHICH CAN BE CLEANED

(75) Inventors: Jens Burmester, Grambek (DE); Matthias Südel, Ratekau (DE)

(73) Assignee: GEA TUCHENHAGEN GmbH, Buechen (DE)

( * ) Notice: Subject to any disclaimer, the term of this patent is extended or adjusted under 35 U.S.C. 154(b) by 677 days.

(21) Appl. No.: 12/452,028

(22) PCT Filed: Jun. 9, 2008

(86) PCT No.: PCT/EP2008/004592
§ 371 (c)(1),
(2), (4) Date: Dec. 11, 2009

(87) PCT Pub. No.: WO2008/155043
PCT Pub. Date: Dec. 24, 2008

(65) Prior Publication Data
US 2010/0132822 A1 Jun. 3, 2010

(30) Foreign Application Priority Data
Jun. 16, 2007 (DE) .......................... 10 2007 027 765

(51) Int. Cl.
*F16K 1/44* (2006.01)
(52) U.S. Cl.
USPC ...................................... 137/240; 137/614.18
(58) Field of Classification Search
USPC ................ 137/238, 240, 312, 614.18, 614.19
See application file for complete search history.

(56) References Cited

U.S. PATENT DOCUMENTS

| 6,230,736 | B1 * | 5/2001 | Scheible et al. .............. 137/240 |
| 6,676,047 | B1 * | 1/2004 | Lindholm Jensen et al. . 137/240 |
| 2011/0309285 | A1 * | 12/2011 | Sauer ............................. 251/359 |

FOREIGN PATENT DOCUMENTS

| DE | 3835944 | 4/1990 |
| DE | 19608792 | 9/1997 |
| DE | 19722615 | 12/1998 |
| EP | 0039319 | 11/1981 |
| EP | 0174384 | 3/1986 |
| WO | WO2007/054131 | 5/2007 |
| WO | WO2007/054134 | 5/2007 |

OTHER PUBLICATIONS

"Operating Instructions BAA D620-PMO.32, Double Seat Valve Type D 620 PMO" Jun. 30, 1999, Suedmo Components GmbH, Riesbuerg, Germany.

* cited by examiner

*Primary Examiner* — Kevin Lee
(74) *Attorney, Agent, or Firm* — Merek, Blackmon & Voorhees, LLC (57) ABSTRACT

The invention relates to a double-seat valve including closing elements (3,4) which can be transferred independently of one another by a respective partial lift gap-wide into a seat cleaning position for purposes of flushing their coaxial seat surfaces (2a, 2b), the second closing element (4) by a second partial lift (T2) which acts in the same direction as the opening motion and the first closing element (3) by a first partial lift (T1) which acts in the direction opposite the opening motion travelling into its respective seat cleaning position. The second closing element (4) in its closed position has a stop face (4f) forming a second circumferential edge (U2). A deflection surface (4d) discharges in a front face (4e) of a recess (4b) which is oriented essentially perpendicular to the longitudinal axis of the second closing element (4). The deflection surface (4d) has a contour (K) which runs without bends.

19 Claims, 7 Drawing Sheets

DOUBLE-SEAT VALVE, THE SEATS OF WHICH CAN BE CLEANED

CROSS-REFERENCE TO RELATED APPLICATION

The present application claims the priority under 35 U.S.C. 119 of German Application No. 10 2007 027 765.4, filed Jun. 16, 2007, which is hereby incorporated herein by reference in its entirety.

TECHNICAL FIELD

The invention relates to a double seat valve, the seats of which can be cleaned, with two serially arranged closing elements which can be moved relative to one another and which in the closed position of the double seat valve prevent overflow of fluids from one valve housing part into another, which border between themselves both in the closed and also in the open position a leakage cavity which is connected to the vicinity of the double seat valve, in the closed position the first closing element which is made as a slide piston being accommodated to form a seal in a connection opening which joins the valve housing parts to one another and in the course of its opening motion making sealing contact with a second closing element which has a second seal and which is associated with the second seat surface, and the latter closing element in the continued opening motion being likewise transferred into the open position, the first closing element in its end section having a first seal which radially seals relative to a cylindrical first seat surface which is made in the connection opening, the second closing element on its end facing the first closing element having a recess with an essentially cylindrical circumferential wall which is flush with the cylindrical first seat surface and the recess being dimensioned in such a way as to accommodate the end section and the radial first seal of the first closing element to form a seal during the opening motion before the second closing element opens.

PRIOR ART

EP 0 039 319 B1 discloses a double seat valve of the initially described type. The second closing element in this double seat valve is made as a seat disk whose seal acts purely axially on the assigned seat (seal with pressing engagement). The double seat valve, however, is not able to have its seats cleaned so that the prior art discloses no indications of flow engineering treatment of the seat cleaning flows generated when the seat is cleaned. Cleaning of the seats can be adequately defined as gap-wide exposure of the two seat surfaces of a double seat valve, separately and independently of one another, by partial lifting of the respective closing element, as a result of which cleaning liquid flows out of the valve housing part which is associated with the closing element on the path via the exposed seat into the leakage cavity.

A seat-cleanable double seat valve which allows cleaning of the respectively exposed seat by gap-wide opening of its seats is disclosed by DE 38 35 944 C2. Each of the three seals in this known double seat valve is a discrete seal, each seal having only a single function. The first seal in the first closing element is a strictly radially acting seal which slides in the first sealing surface made as a cylindrical envelope and seals there as a result of the provided pretensioning (seal with sliding engagement). The second seal in the second closing element acts on the second seat surface which is conical in shape so that the seal can act axially/radially here (seal with sliding/pressing engagement). The third seal, the so-called intermediate seal, develops its action when the first closing element in the opening lift comes into contact with the second closing element by way of this intermediate seal and, in the course of the continued opening motion, entrains the second closing element into the fully open position (seal in pressing engagement). The intermediate seal, in this case, is located in the front face which faces the leakage cavity on the second dependently driven closing element.

The seat cleanable double seat valve according to DE 38 35 944 C2 has two so-called seat cleaning positions, the first seat cleaning position being produced by the first partial lift of the first closing element which acts in the opposite direction to the opening lift. In the seat cleaning position of the first closing element (relative to the position of the drawing as shown in FIG. 3, this is the lower closing element) the passage of a discharge bore which is connected to the first closing element and which is made as a pressure balance piston through the lower valve housing is at the same time exposed for purposes of cleaning of the assigned seal. The seat cleaning position of the second (upper) closing element is not further addressed in DE 38 35 944 C2; it takes place by the second partial lift which acts in the same direction as the opening lift. The respective amount of cleaning liquid in seat cleaning is limited by a more or less complex and often inadequate adjustment of the exposed gap between the respective seal and the associated seat surface.

For the double seat valve as shown in EP 0 039 319 B1, the seal in the first closing element has a double function; on the one hand it acts as a seat seal and, on the other hand, in the course of the opening motion and in the full open position of the double seat valve, also assumes the function of an intermediate seal in the double seat valve according to DE 38 35 944 C2.

A double seat valve which is limited solely to exposing the seat in the region of the associated closing element in seat cleaning and which, moreover, implements a connection of the leakage cavity to the vicinity of the double seat valve, which connection is generously dimensioned, the passage cross section of the connection corresponding roughly to the passage cross section of the greatest pipe width connected to the double seat valve, is described in company publication "Operating Instructions BAA D620-PMO.32, Double Seat Valve Type D 620 PMO" of Sümo Components GmbH, D-73469 Riesbürg. This double seat valve, due to its generous dimensioning of the connecting line between the leakage cavity and the exterior, is basically suited to preventing a pressure build-up in the leakage cavity in case of major seal defects.

To limit the amount of cleaning liquid in seat cleaning, providing throttle gaps which are located, for example, on the leakage space side and which are series-connected to the respectively exposed seat is known. A double seat valve, in this connection, is described in DE 196 08 792 A1. In this double seat valve the first seat cleaning position is produced by the first partial lift which acts in the opposite direction to the opening lift. Here, a cylindrical lug located on the first closing element on the leakage space side with the assigned cylindrical first seat surface forms the first throttle gap via which the amount of cleaning liquid which has been delivered from the adjacent first valve housing part can be limited. The seat cleaning position of the second closing element takes place by the second partial lift which acts in the same direction as the opening lift, in the partially open position the cylindrical lug located on the second closing element on the leakage space side forming with the assigned part of the connection opening a second throttle gap which quantitatively limits the second seat cleaning flow produced in this seat cleaning position. Since the two closing elements and the assigned cylindrical lugs have different diameters, the associated sections of the connection opening between the two valve housing parts are likewise different in diameter so that between these two diameters a transition surface arises.

This transition surface, which forms an obtuse, preferably, a right deflection angle with the section of larger diameter, results in that in the seat cleaning position of the first closing element, the first seat cleaning flow does not directly impact the second throttle gap and thus the seat region of the second closing element. Analogously, the second seat cleaning flow is prevented from acting directly on the first throttle gap and thus the seat region in the seat cleaning position of the second closing element.

In the seat and closing element configuration of the double seat valve according to EP 0 039 319 B1, such a transition surface and its action mechanism as a rule are unavailable so that the currently popular demand for preventing direct action on the seat regions in the course of cleaning the seat cannot be satisfied by this known double seat valve.

The requirements imposed on a seat-cleanable double seat valve in certain countries go beyond the aforementioned limitation of the amount of cleaning liquid and prevention of direct action on the seal region and are more extensive. Thus, for example, in the United States of America, it is required that for larger seal defects or even the loss of one of the two seat seals of the closing element in the closed position in the course of seat cleaning of the other closing element, no cleaning liquid may pass through via the respective seal defect or the seat region without a seat seal. Under these conditions, not only is the requirement for limiting the amount of cleaning liquid and avoiding direct admission into the seat regions in the course of seat cleaning imposed on this double seat valve, but also the requirement for discharge of the seat cleaning flow as much as possible without turbulence initially into the leakage cavity and from there into the exterior without the respectively closed seat region being exposed to a direct incident seat cleaning flow and/or its secondary flows or being acted upon in such as way as to raise the pressure.

Direct action is defined as any velocity component from the respective seat cleaning flow, which component is directed perpendicular to the walls that border the seat region. Specifically, it has been shown that any direct action in this respect leads to conversion of kinetic flow energy into static pressure. Depending on the impact angle of the flow on the flow-exposed wall surface or body surface there is a branching flow with a so-called "branching flow line", the latter dividing the flow into two halves. The branching flow line itself runs against the so-called "stagnation point" so that the velocity is equal to zero at this point. The pressure increase as a result of this velocity stopping is also called the "impact pressure". The above described pressure-increasing mechanisms, if they become active, generate a leakage flow via the respective throttle gap and the defective seat seal or one which is completely absent.

Direct impact of the seat cleaning flow on the surfaces which border the leakage cavity is therefore always counterproductive. With the exception of the double seat valve according to DE 196 08 792 A1, in the other known double seat valves described above, the first seat cleaning flow, which is generated by air striking the first closing element by the first partial lift, can more or less perpendicularly strike the front face boundary surface of the second closing element which holds the intermediate seal (DE 38 35 944 C2; double seat valve Type D 620 PMO) or the cylindrical recess (EP 0 039 319 B1). At the impact site this flow is diverted mainly toward the center of the leakage cavity. Furthermore, at the impact site a branching flow line arises whose branch facing the seat region can generate a vortex and an impact pressure there. The second seat cleaning flow which is generated by air striking the second closing element by the second partial lift more or less directly strikes the front face boundary surface of the first closing element, and, here as well, the part of the flow located between the branching flow line and the seat region can be supplied to the latter, forming impact pressure.

WO 2007/054 131 A1 and WO 2007/054 134 A1 already propose measures to ensure discharge of the seat cleaning flow into and out of the leakage cavity as much as possible without turbulence and to avoid pressure-increasing direct action on the seat surfaces. These measures, however, relate to a double seat valve with the features of DE 196 08 792 A1 which were briefly outlined above.

The object of this invention is to develop a double seat valve of the initially described type such that discharge of the seat cleaning flow into and out of the leakage cavity as much as possible without turbulence is ensured and pressure-increasing direct action on the seat areas is reliably avoided.

SUMMARY OF THE INVENTION

The object is achieved by a double seat valve with the features of claim 1. Advantageous embodiments of the double seat valve whose seats can be cleaned according to the invention are described in the dependent claims.

To achieve the object underlying the invention, the first basic inventive concept consists in feeding the seat cleaning flow which emerges from the assigned gap between the seat seal and the seat surface in the respective seat cleaning as much as possible without turbulence and barriers into the leakage cavity and from there discharging it into the exterior in the same manner. This is achieved, on the one hand, by a new flow contour which steers and guides the seat cleaning flows in the leakage cavity. This new flow contour for seat cleaning of the first closing element which lies underneath provides for the first seat cleaning flow to follow the wall shape in the region of the first seat surface without detachment. Then, in the cylindrical recess of the second closing element, which recess is flush with the cylindrical first seat surface, smooth deflection of this first seat cleaning flow takes place so that the latter can travel into a discharge bore which is located centrally in the first closing element without colliding with the regions enclosing the leakage cavity, forming impact pressure. This is achieved in that the circumferential wall of the cylindrical recess on its end facing away from the first closing element undergoes transition into a rotationally symmetrical deflection surface and this deflection surface discharges in the front face of the recess which is oriented essentially perpendicular to the longitudinal axis of the second closing element.

Smooth deflection of the seat cleaning flow in the deflection surface is essential. This is achieved according to the invention in that, viewed in a vertical center section, the deflection surface runs without bends, a direction vector in the discharge point of the deflection surface under the aforementioned conditions being oriented toward the central discharge bore located in the closing element.

In flow guidance of the second seat cleaning flow generated by air striking the second closing element, it is essential that this flow detaches in a defined manner on a first circumferential edge which is formed by the second seat surface and the first end section of the first seat surface and is reliably routed tangentially past the surfaces which enclose the first closing element in the region of the leakage cavity. For this purpose, between the first circumferential edge and the pertinent regions of the first closing element there is a safety distance which under all possible circumstances of production engineering prevents impact in this connection.

This safety distance of the first closing element from the direction vector at the exit site of the second seat surface into the first end section of the first seat surface is advantageously dimensioned such that it is at least as large as the sum of all production tolerances of the components of the double seat valve which in the closed position of the first closing element determine its smallest axial distance to the second seat surface.

A second basic inventive concept consists in shifting the end position boundary, the desirable fixed stop of the second closing element which is not or cannot be accomplished in all cases (seat disks with axially acting seal in pressing engagement or seat disks with radially/axially acting seal in sliding/pressing engagement) in its closed position to the end of the seat, directly bordering the first seat surface. This is achieved according to the invention in that the second closing element in its closed position adjoins the second seat surface with a stop face which is located on its boundary surface adjacent to the second seal radially inside. Here, the stop face with the circumferential wall forms a second circumferential edge.

This measure eliminates the current gap which borders the leakage cavity between the second closing element and the valve housing, its generally being a metallic closure. At this point, in the course of seat cleaning of the closing element, cleaning liquid cannot reach the potentially defective seat seal or the seat seal which may not be entirely present any more by way of the metallically closed gap between the second closing element and the second seat surface.

Until now this defined closing of this critical gap was not provided in prior art double seat valves of the initially described type. In the implementation of the second basic inventive concept it is essential that the respective stop face on the second closing element and on the valve housing tightly and directly touch at the leakage cavity, completely circumferentially, as far as this is possible for solid or metallic contact.

The degrees of freedom in the configuration of the second closing element with respect to possible action mechanisms of the seat seal are not limited by the aforementioned stop face. Fundamentally, in this region there can be purely axially or radially/axially acting second seals.

It has furthermore been found to be favorable with respect to avoiding any formation of impact pressure if the first circumferential edge formed by the second seat surface and the end section of the first seat surface is rounded with the smallest possible second corner rounding. Ideally, a sharp-edge execution could be provided here, which, however, for reasons of production engineering and practical reasons (endangerment of the first seal) is not feasible.

To achieve a smooth transition of the radial first seal from the cylindrical first seat surface into the cylindrical circumferential wall of the recess in the second closing element it is furthermore proposed that the cylindrical circumferential wall ends in the second inlet slope and the latter with the stop face forms the second circumferential edge.

In order to prevent formation of impact pressure when the first seat cleaning flow enters the deflection surface in the second closing element, another proposal calls for the second circumferential edge formed by the stop face and the circumferential wall or the second inlet slope to be rounded with the smallest possible first corner rounding. A sharp-edged transition in this region is not favorable either here for reasons of production engineering and practical reasons, a relatively great radius of curvature is counterproductive and leads to unwanted formation of impact pressure.

In order to prevent the first seat cleaning flow after leaving the deflection surface from flowing against the front face of the recess to form impact pressure, it is furthermore provided that the deflection surface undercuts the front face by the axial undercutting distance. In this way the contour of the deflection surface in the region of its discharge point can be pitched by a second deflection angle relative to the front face of the cylindrical recess such that the first seat cleaning flow is easily deflected in the direction to the second closing element and then can follow the wall shape of the bordering front face of the cylindrical recess for purposes of its cleaning. It has been found to be advantageous if the second deflection angle is made in the range of 5 to 20 degrees, preferably with 15 degrees.

A flow result that is satisfactory in the same way is achieved according to another proposal by the contour being composed of a sequence of curved segments which on their respective transition sites each have a common tangent. Another embodiment calls for the contour to consist of a single section of continuously altered curvatures. Finally, it is also proposed that the contour is formed from a single section with a constant curvature.

In order to ensure discharge of the cleaning liquid without problems or disruption under all pressure and velocity conditions, it is provided that the discharge bore connects the leakage cavity to the vicinity of the double seat valve by way of several connecting bores which are distributed over the periphery, and that the front-face boundary of the first closing element which faces the leakage cavity has a chamfer which declines toward the discharge bore and which is circumferential on all sides.

In order to prevent the formation of vortices and impact pressure not only in the region of the above described seats surfaces of the double seat valve, it is advantageous if any internals and barriers in the remaining leakage cavity, as much as this is structurally possible, are omitted. In this respect, therefore, another proposal calls for the discharge bore to connect the leakage cavity to the vicinity of the double seat valve, and for the front-side boundary of the first closing element which faces the leakage cavity to have a chamfer which declines circumferentially on all sides toward the discharge bore. In this version a first shifting rod which is connected to the first closing element concentrically penetrates a second shifting rod which is made as a hollow rod and which is connected to the second closing element, continues floating through the discharge bore and is tightly connected on the end of the first closing element facing away from the second closing element to the first closing element via at least one essentially radially oriented traverse. In this way, the struts and other connecting means which are otherwise conventional in the region of the leakage cavity are avoided and shifted to the end which is relatively far away from the leakage cavity, where they can no longer have disruptive effects on flow guidance.

The aforementioned chamfer of the front face of the first closing element which is facing the leakage cavity is advantageously made as the envelope of a cone which is inclined relative to the base surface of the cone in the range of 10 to 20 degrees, preferably 15 degrees.

In this context, it is furthermore proposed that there are three traverses which are arranged distributed uniformly over the circumference securely on a section of the shifting rod, and which are tightly connected each radially outside to the circumferential ring and that the section of the shifting rod, the crosspieces and the ring form an integral welding part.

Here, it is furthermore advantageous if the welding part on the outside via the ring adjoins a pressure balance piston which borders the section of the discharge bore away from the leakage cavity, and on the inside adjoins the first shifting rod by way of a section of the shifting rod and if the ring in its inside diameter is enlarged relative to the diameter of the discharge bore with the interposition of a conically widening transition region such that the inside passage of the discharge bore is not narrowed by the traverses.

A second embodiment which relates to the second seat surface calls for the second seat surface to be made conical and to be tilted relative to the cylindrical recess by the seat angle, and for the second seal to seal axially/radially relative to the second seat surface in sliding/pressing engagement, the stop face adjoining the second seat surface according to the invention. The seat angle is made here in the range between 25 and 35 degrees, preferably with 30 degrees.

According to another configuration, it is proposed that the second seat surface is perpendicular to the longitudinal axis of the double seat valve, and that the second seal surface seals axially relative to the second seat surface in pressing engagement, here, the stop face also adjoining the second seat surface according to the invention.

Such solutions are possible with the advantages of an axially/radially or a purely axially acting seal and a correspondingly interacting seat disk when the second seal is on the one hand made ductile and on the other can also undergo a change of shape with constant volume within the scope of its embedding such that the fixed contact of the second closing element with its stop face against the second seat surface, which contact is provided according to the invention, is ensured under all conditions, the fixed contact generally being a metallic contact.

In the above described first embodiment of the double seat valve according to the invention, the amount of cleaning liquid in seat cleaning is conventionally limited by adjusting the gap between the respective seat seal and the associated seat surface.

This invention within the scope of a second embodiment calls for limiting the amount of cleaning liquid in seat cleaning by means of a conventional throttle gap. For this purpose, it is provided that the end section provided on the first closing element on the leakage cavity side is made in the form of a cylindrical lug which with the first seat surface forms an annular first throttle gap. The second closing element, relative to its second seal, radially outside has a cylindrical circumferential contour, the latter forming an annular second throttle gap with an annular cylindrical recess in the connection opening on the side of the second closing element.

BRIEF DESCRIPTION OF THE DRAWINGS

Embodiments of the proposed seat cleanable double seat valve according to the invention are shown in the drawings and are described below according to structure and function.

FIG. 3 shows in a longitudinal section and extract an enlargement of the seat region of the double seat valve as shown in FIGS. 1 to 2a;

DETAILED DESCRIPTION

The double seat valve 1 according to the invention (FIGS. 1 and 1a) in a first embodiment consists essentially of a valve housing 10 with a first and a second valve housing part 1a and 1b, two closing elements 3 and 4 which can move independently of one another with associated shifting rods 3a and 4a, and a seat ring 2 which produces a connection between the valve housing parts 1a, 1b by way of an inside connection opening 2c.

Figure 1:
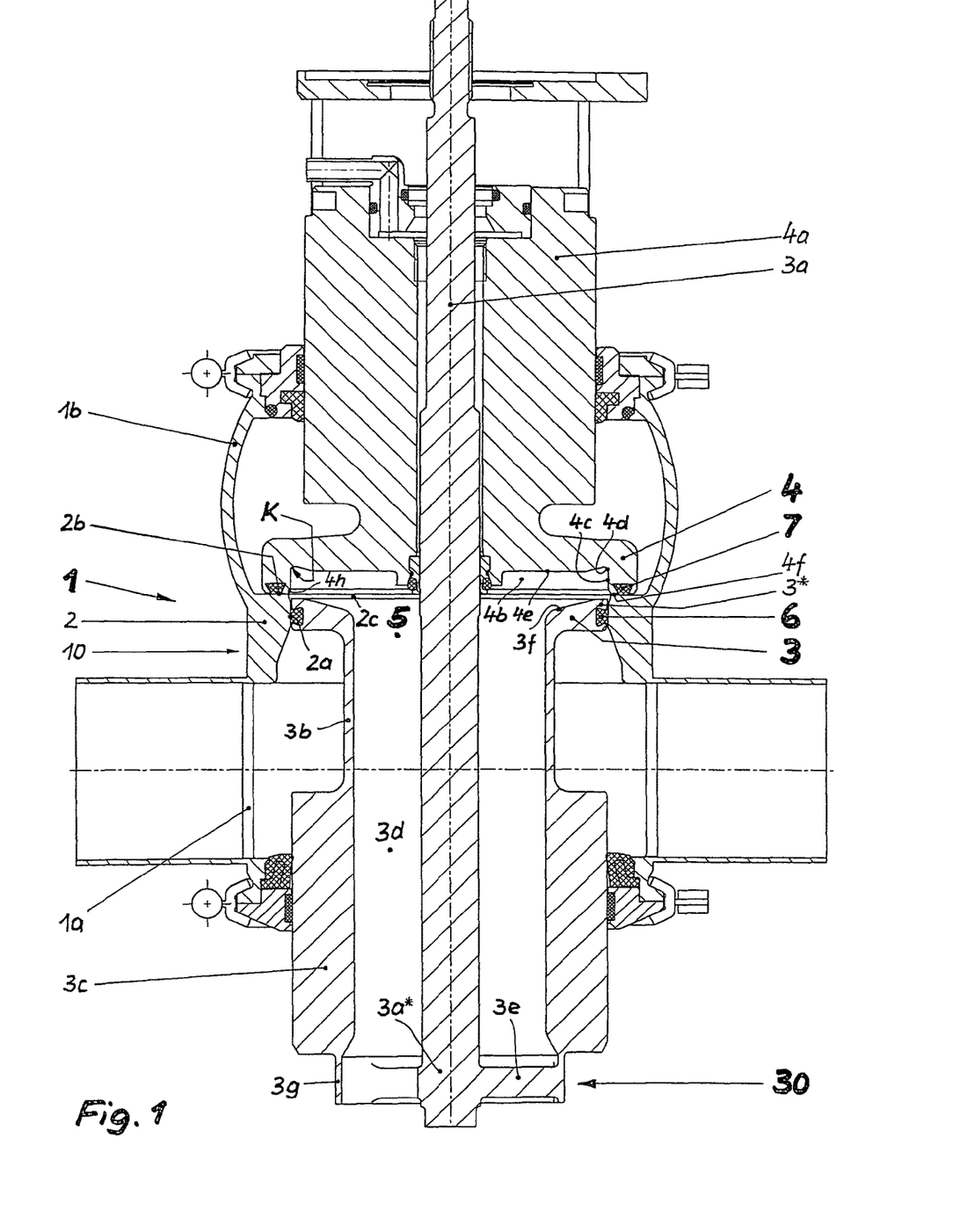
FIG. 1 shows in a longitudinal and vertical center section the seat-cleanable double seat valve according to the invention in a first embodiment, the closed position being shown.
Figure 1A:
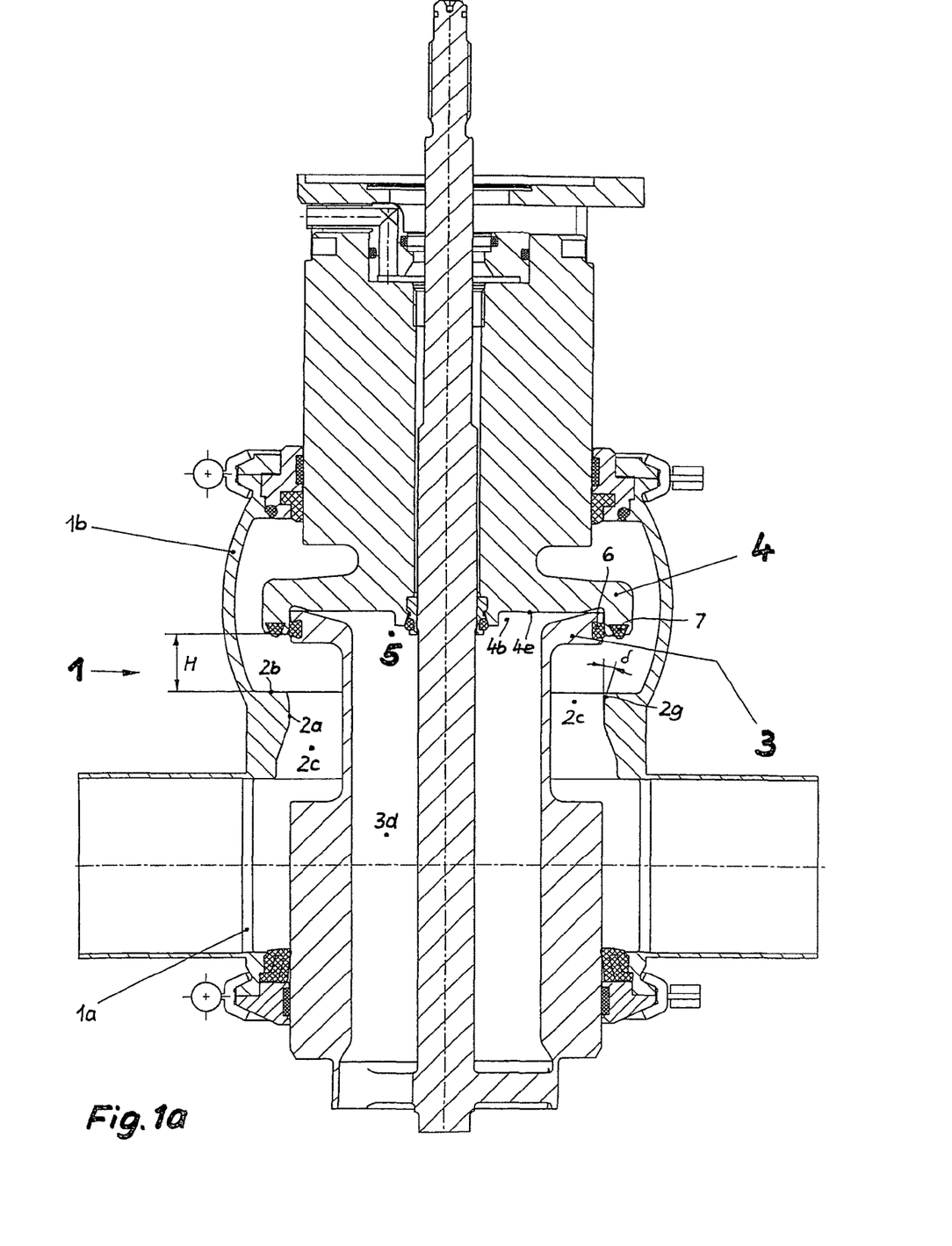
FIG. 1a shows in a longitudinal and vertical center section the double seat valve as shown in FIG. 1, its being in its open position.

The first closing element 3 (active closing element) which is made as a slide piston in the closed position of the double seat valve 1 is held to form a seal in the first seat surface 2a which is formed by the connection opening 2c and which is made as a cylindrical seat surface. For this purpose, in the slide piston 3, there is a first seal 6 which interacts with the first seat surface 2a exclusively by radial pretensioning (radial seal with sliding engagement). The second closing element 4, which is made as a seat disk, in the closed position of the double seat valve 1 interacts with a second seat surface 2b which is made perpendicular to the longitudinal axis of the double seat valve 1 on the top of the seat ring 2. Sealing takes place by way of a second seal 7 which seals axially relative to the second seat surface 2b in pressing engagement (seal with pressing engagement).

The two closing elements 3, 4 both in the illustrated closed as well as open position between themselves form a leakage cavity 5 which is connected to the vicinity of the double seat valve 1 by way of a discharge bore 3d which centrally penetrates a connecting part 3b which is connected to the first closing element 3 and a pressure balance piston 3c which continues on the connecting part.

Figures 5A, 5B:
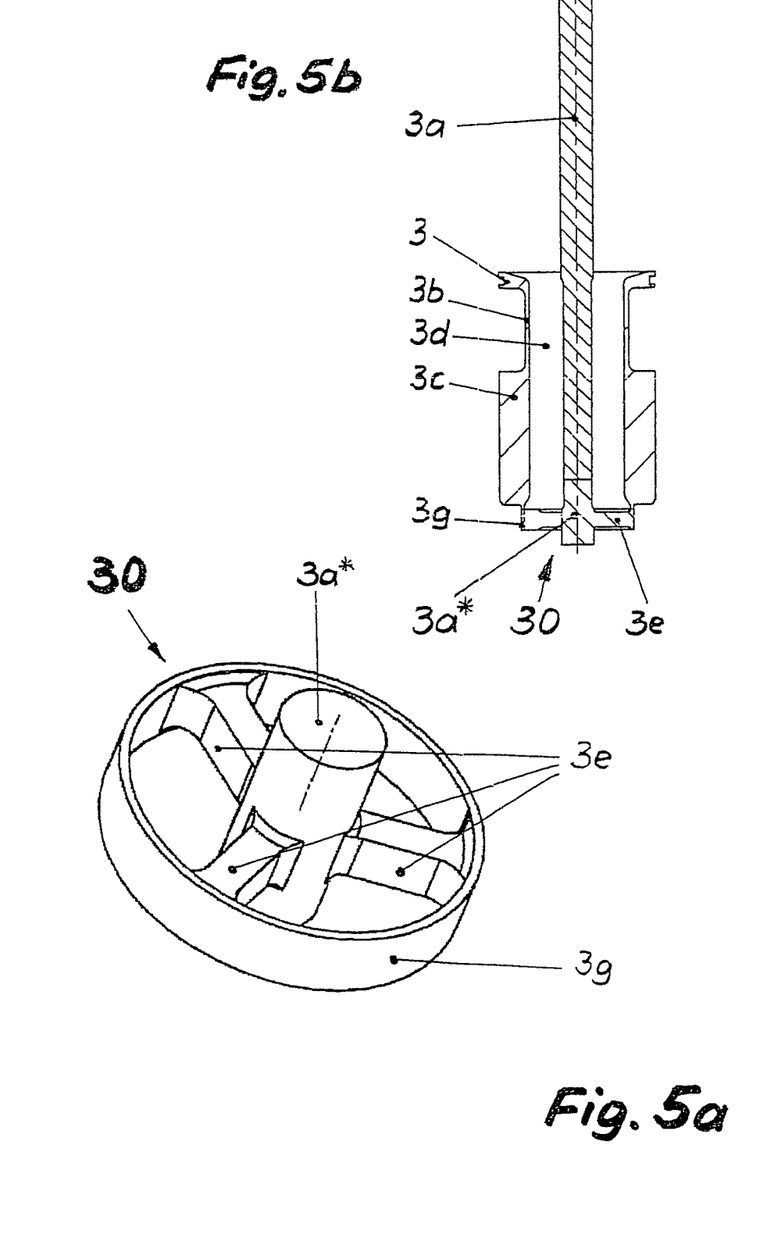
FIG. 5a shows in a perspective an integral welding part consisting of three traverses which tightly connect the section of the shifting rod to a ring, for connecting the first valve rod to a pressure balance piston which is located on the end of the first closing element away from the leakage cavity.
FIG. 5b shows in a vertical center section a composite construction of a first closing element and indirectly bordering pressure balance piston, welding part and first valve rod.

Conventionally, the first shifting rod 3a in the region of the first closing element 3 is securely connected to the latter by way of several webs which penetrate the discharge bore 3d in a star shape and in the radial direction. In the present case, these webs are formed between connecting bores 3d* (FIG. 3) which penetrate the closing element 3 distributed over the circumference and connect the discharge bore 3d to the leakage cavity 5. Since these webs between the connecting bores 3d* can have adverse reactive effects on the flow conditions and the flow pattern in the leakage cavity 5, in the double seat valve 1 according to the invention it is preferably provided that these mechanically necessary connecting sites in the form of three traverses 3e which are located distributed uniformly over the circumference are shifted a distance away from the leakage cavity 5, preferably towards the end of the pressure balance piston 3c facing away from the first closing element 3 (FIGS. 1, 1a). The fixed connection to the piston takes place by way of a circumferential ring 3g to which the traverses 3e are securely connected radially on the outside. Advantageously, the traverses 3e, the ring 3g, and shifting rod section 3a are combined in an integral welding part 30 (FIGS. 5a, 1).

Figure 2:
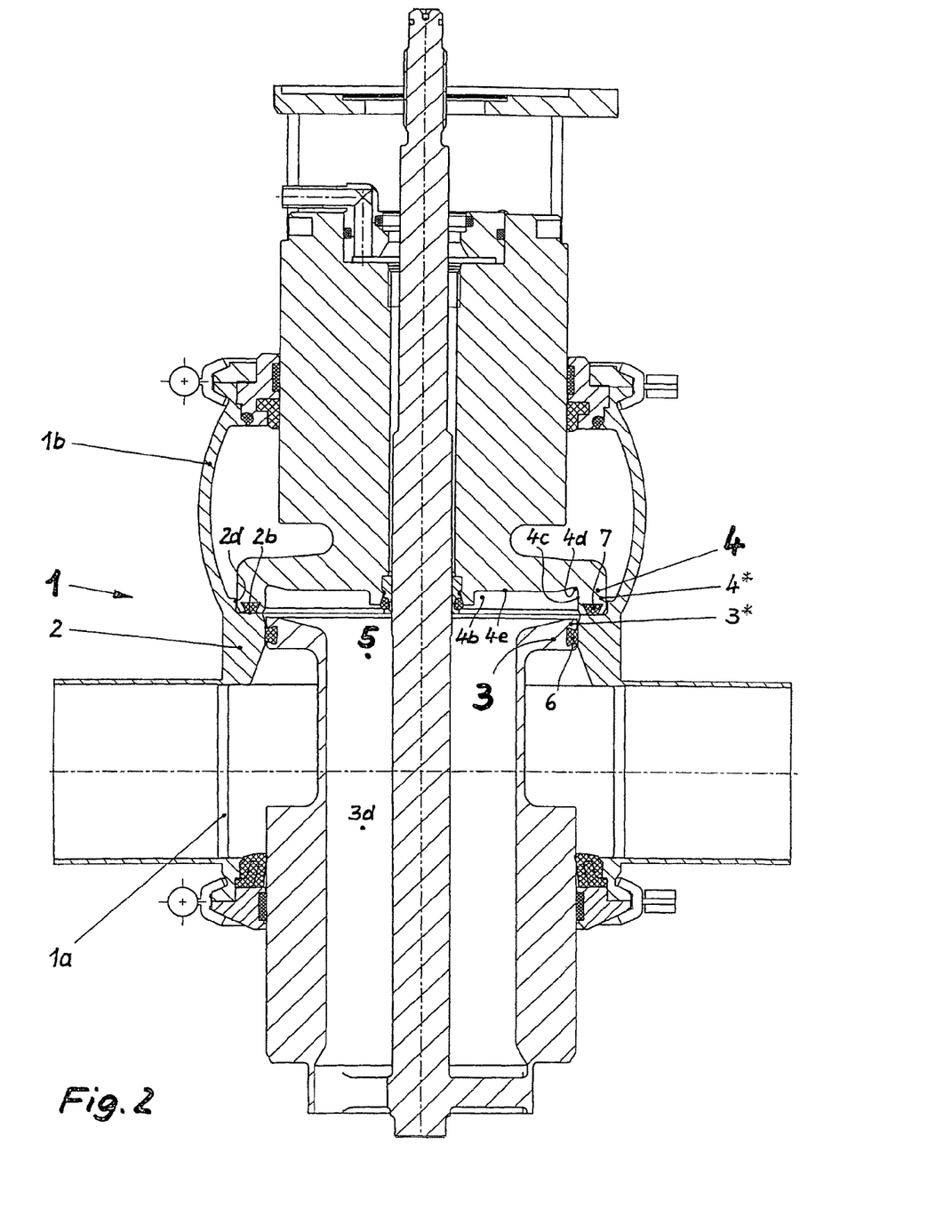
FIG. 2 shows in a longitudinal and vertical center section the double seat valve according to the invention in a second embodiment, the double seat valve being in its closed position and there being a limitation of the amount of cleaning liquid in both seat cleaning positions at this point by means of a throttle gap.
Figure 3:
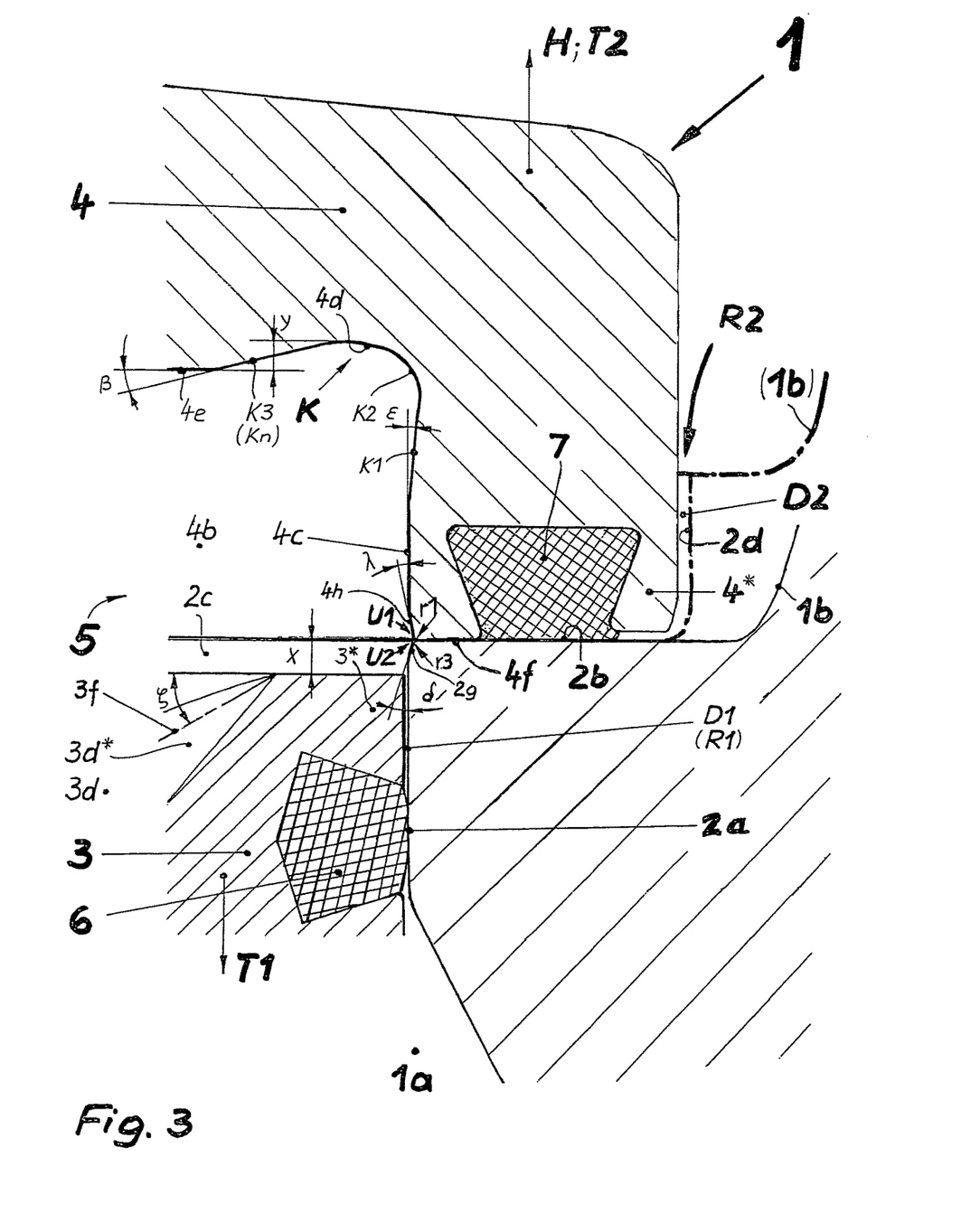

The second closing element 4 on its end facing the first closing element 3 has a recess 4b with an essentially cylindrical circumferential wall 4c which is flush with the cylindrical first seat surface 2a (FIGS. 1 to 3). This circumferential wall 4c is dimensioned such that during the opening motion it accommodates the end section 3* and the radial first seal 6 of the first closing element 3, forming a seal, before the second closing element 4 opens.

The circumferential wall 4c of the cylindrical recess 4b in the second closing element 4 on its end facing away from the first closing element 3 undergoes transition into a rotationally symmetrical deflection surface 4d (starting point of the contour (K)) (FIGS. 3, 1), and this deflection surface 4d discharges in the front face 4e of the recess 4b which is oriented essentially perpendicular to the longitudinal axis of the second closing element 4 with a second deflection angle β. A second circumferential edge U2, which is formed by the circumferential wall 4c and a closing element-side stop face 4f, in the closed position of the second closing element 4 directly borders the first seat surface 2a. Viewed in a vertical center section, the deflection surface 4d has a contour K which runs without bends, a first section K1 of the contour K which borders the circumferential wall 4c continuing over other sections K2 and K3 (FIG. 3) and the direction vector at the end point of the last section K3 or Kn being oriented toward the discharge bore 3d which is located centrally in the first closing element 3 or toward the connecting bores 3d* without colliding with the first closing element 3 in the area of its regions enclosing the leakage cavity 5.

So that a first seat cleaning flow R1 which is routed via the gap between the first seal 6 and the first seat surface 2a after the first partial lift T1 of the first closing element 3 which is oriented downward relative to the position in the figure can be routed along the front face 4e of the recess 4b as tangentially as possible, without taking effect to form stagnation pressure (FIG. 3), the deflection surface 4d undercuts the front face 4e by an axial undercut distance y. A front-side boundary of the first closing element 3 facing the leakage cavity 5 has an axial safety distance x from the direction vector at the exit site of the second seat surface 2b into a first end section 2g which is made on the first seat surface 2a, the exit site being made in the form of a first circumferential edge U1.

In the open position of the double seat valve (FIG. 1a), when a full opening lift H has been accomplished, it becomes clear that the first seal 6 which acts radially on the circumferential wall 4c of the recess 4b provides for reliable sealing of the two closing elements 3, 4 between the valve housing parts 1a, 1b which are connected to one another by way of the connection opening 2c on the one hand and the leakage cavity 5 on the other.

FIGS. 1 and 3 illustrate that the cylindrical circumferential wall 4c on its end facing the first closing element 3 begins with a second inlet slope 4h which is made preferably with a chamfer angle λ in the range from 5 to 15 degrees and here, in turn, preferably with 15 degrees and that the circumferential wall 4c on its other end undergoes transition into the first section K1. The latter is angled radially to the outside at a first deflection angle ε relative to the circumferential wall 4c, this first deflection angle ε being less than 15 degrees.

FIG. 3 furthermore illustrates that in the closed position of the double seat valve 1 the first and the second circumferential edge U1, U2 end congruently at the leakage cavity 5. Here, the first end section 2g can be made as a conical section (first inlet slope) with exclusively curved or curved and straight contour elements, which is joined to the seat surface 2a by the radius of curvature r2 (see also FIGS. 4 and 1a) and opens toward the second closing element 4. The first end section 2g is tilted by an angle of pitch δ against the first seat surface 2a. The angle of pitch δ is made in the range of 0 to 15 degrees, preferably in the range of 5 to 15 degrees and here, in turn, preferably with δ=15 degrees.

Figure 4:
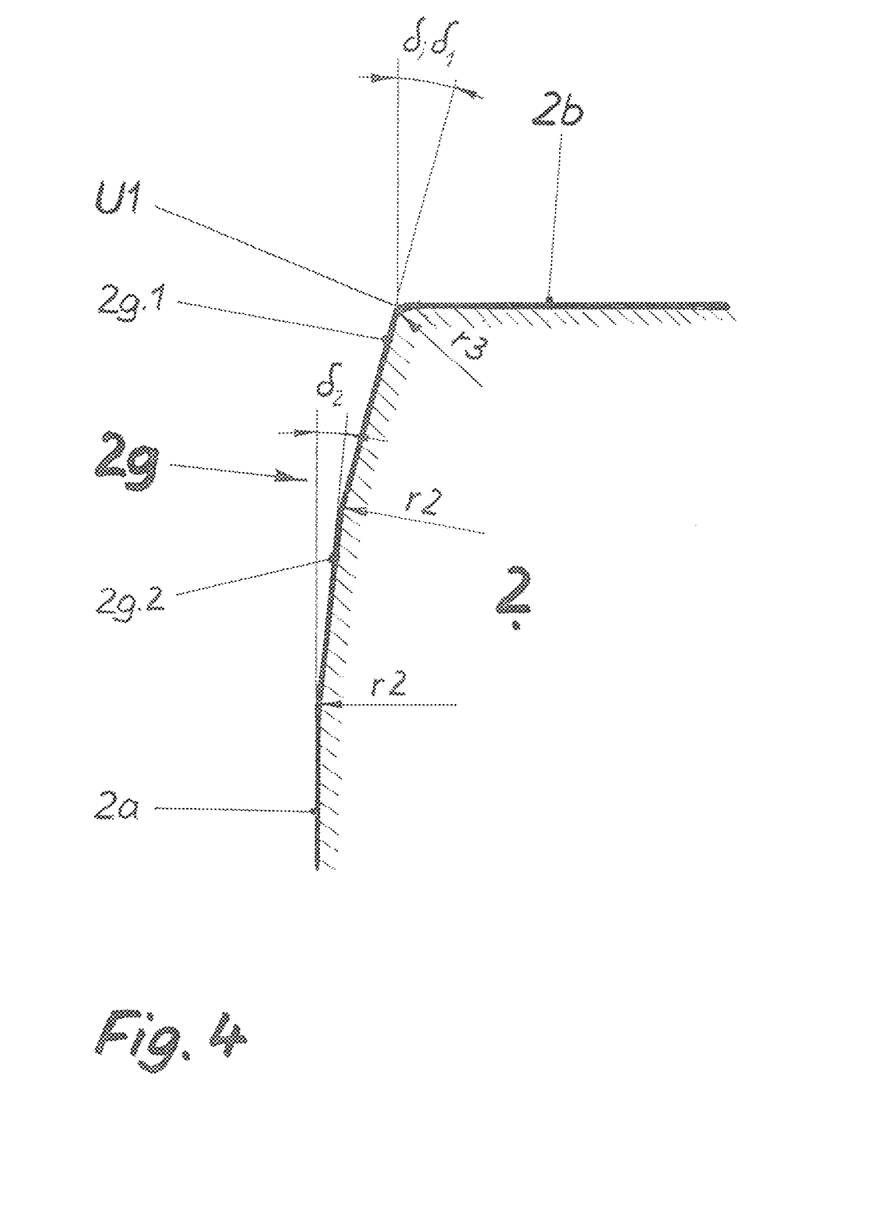
FIG. 4 shows schematically and enlarged the contour of the seat region for the first closing element and the bordering second seat surface for a double seat valve as shown in FIGS. 1 to 3.

Further optimization of the first end section 2g in the form of a further improved inlet slope is characterized as shown in FIG. 4 in that the first end section 2g is formed by two envelopes of a cone which undergo transition into one another rounded with the radius of curvature r2, a second envelope of a cone 2g.2 which is joined directly to the first seat surface 2a being tilted by a second angle of pitch $δ_2$ against the first seat surface 2a and the other (the first) envelope of a cone 2g.1 being tilted by a first angle of pitch $δ_1$ against the first seat surface 2a. The first angle of pitch $δ_1$ is made in the range of 7.5 to 15 degrees, preferably with $δ_1$=15 degrees, and the second angle of pitch is made in the range of 5 to 10 degrees, preferably with $δ_2$=7.5 degrees.

Furthermore, it is shown in FIGS. 1 to 3 that the front face of the first closing element 3 toward the discharge bore 3d is provided with a declining conical chamfer 3f, the latter preferably being made as the envelope of a cone and being inclined by an angle of inclination ζ relative to the base of the cone. This angle of inclination ζ is preferably made in the range of 10 to 20 degrees and here again preferably with ζ=15 degrees.

The first seat cleaning flow R1 which emerges after completion of the first partial lift T1 from the gap between the first seal 6 and the first seat surface 2a (FIG. 3) in the course of seat cleaning of the first closing element 3 first flows vertically along the first seat surface 2a, without detaching follows the shape of the end section 3* made as a first inlet slope 2g or as envelopes of a cone 2g.2, 2g.1 (FIG. 4), bridges the inlet slope 4h, follows the circumferential wall 4c and the adjoining first section K1 which is angled at the second deflection angle ε and without impact enters into the further shape of the deflection surface 4d with its following sections K2 and K3, is diverted there according to the contour K, leaves the third and last section K3 (K3=Kn) with the second deflection angle β, is largely tangentially deposited on the front face 4e and ultimately travels into the region of the discharge bore 3d and the connecting bores 3d*. So that the first seat cleaning flow R1 cannot form an impact pressure on the second circumferential edge U2, the latter in the closed position of the second closing element 4 directly borders the first end section 2g and is rounded with the smallest possible first corner rounding r1.

FIG. 3 details, in particular, the contour K which runs without bends. The first section K1 and the third and last section K3 (K3=Kn) which discharge from the front face 4e are each made straight and these sections K1 and K3 are connected to one another by way of a second section K2 which rounds the latter tangentially with a deflection radius as large as possible.

A further configuration of the deflection surface 4d calls for the contour K to consist of a sequence of curved sections K1 to Kn (e.g., arc of a circle, ellipses, parabolas, hyperbolas) which at their respective transition sites each have a common tangent. According to another configuration, the contour K is formed from a single section of continuously altered curvature (e.g., spirals or another curve shape which can be described as mathematically closed). The contour K according to another proposal is made with a single section with a constant curvature (e.g., a single arc of a circle with the required tangential entry and exit at the first deflection angle ε and the second deflection angle β.

In the double seat valve 1 according to the invention in the first embodiment the second seat surface 2b is arranged perpendicular to the longitudinal axis of the double seat valve (FIGS. 1 and 1a, 3), the second seal 7 located in the second closing element 4 sealing axially relative to this second seat surface 2b in pressing engagement. This solution is possible when the axially acting second seal 7 is ductile and a change of shape of constant volume is possible such that the first stop position of the second closing element 4 is ensured over the closing element-side chamfer surface 4f in the region of the second seat surface 2b which emerges in the first seat surface 2a. The front face of the second closing element 4 which encloses the second seal 7 radially outside recedes a distance to ensure the above described defined fixed stop position by the stop face 4f in the axial direction (FIG. 3).

The second seat surface 2b can also be made conical, the second seal 7 sealing axially/radially relative to the second seat surface 2b in sliding/pressing engagement.

Seat cleaning of the second closing element 4 takes place (FIG. 3) by the latter being struck by air by the second partial lift gap-wide from its associated second seat surface 2b and cleaning liquid in the form of a second seat cleaning flow R2 being routed from the bordering first valve housing part 1b via the exposed second seat surface 2b into the leakage cavity 5. To ensure that the second seat cleaning flow R2 is not diverted prematurely in the direction of the first closing element 3, the first circumferential edge U1 formed by the second seat surface 2b and the first end section 2g is rounded with the smallest possible second corner round r3 (FIG. 4), as a result of which a defined flow detachment site forms at this location. This measure ensures that the second seat cleaning flow R2 is not directed at the seat region of the first seal 6.

The first closing element 3 in seat cleaning of the second closing element 4 is axially positioned such that the second seat cleaning flow R2 can flow unobstructed beyond the first closing element 3. Depending on the given pressure conditions and under the influence of gravity in the arrangement of the double seat valve 1 as shown in the drawings, the liquid jet runs slightly parabolically so that the front face of the first closing element 3 with its chamfer 3f is overflowed tangentially; this is desirable for reasons of cleaning. Thus flow guidance and positioning of the first closing element 3 even achieve suction of the seat region of the first seal 6 so that even with loss or significant damage of the first seal 6, cleaning liquid R2 cannot enter the adjacent first valve housing part 1a.

The leakage space-side end of the gap between the second closing element 4 and the associated second seat surface 2b is, for the most part, sealed tight by the above described fixed stop position of the second closing element 4 with its stop face 4f on the second seat surface 2b (as far as this is generally possible in solid against solid contact, preferably metal against metal). Cleaning liquid of the first seat cleaning flow R1 can no longer enter the gap between the second closing element 4 and the associated second seat surface 2b and thus the region of the second seal 7. Even for a potentially seriously damaged or potentially completely removed second seal 7 therefore there is no longer any passage for cleaning liquid R1.

Figure 2A:
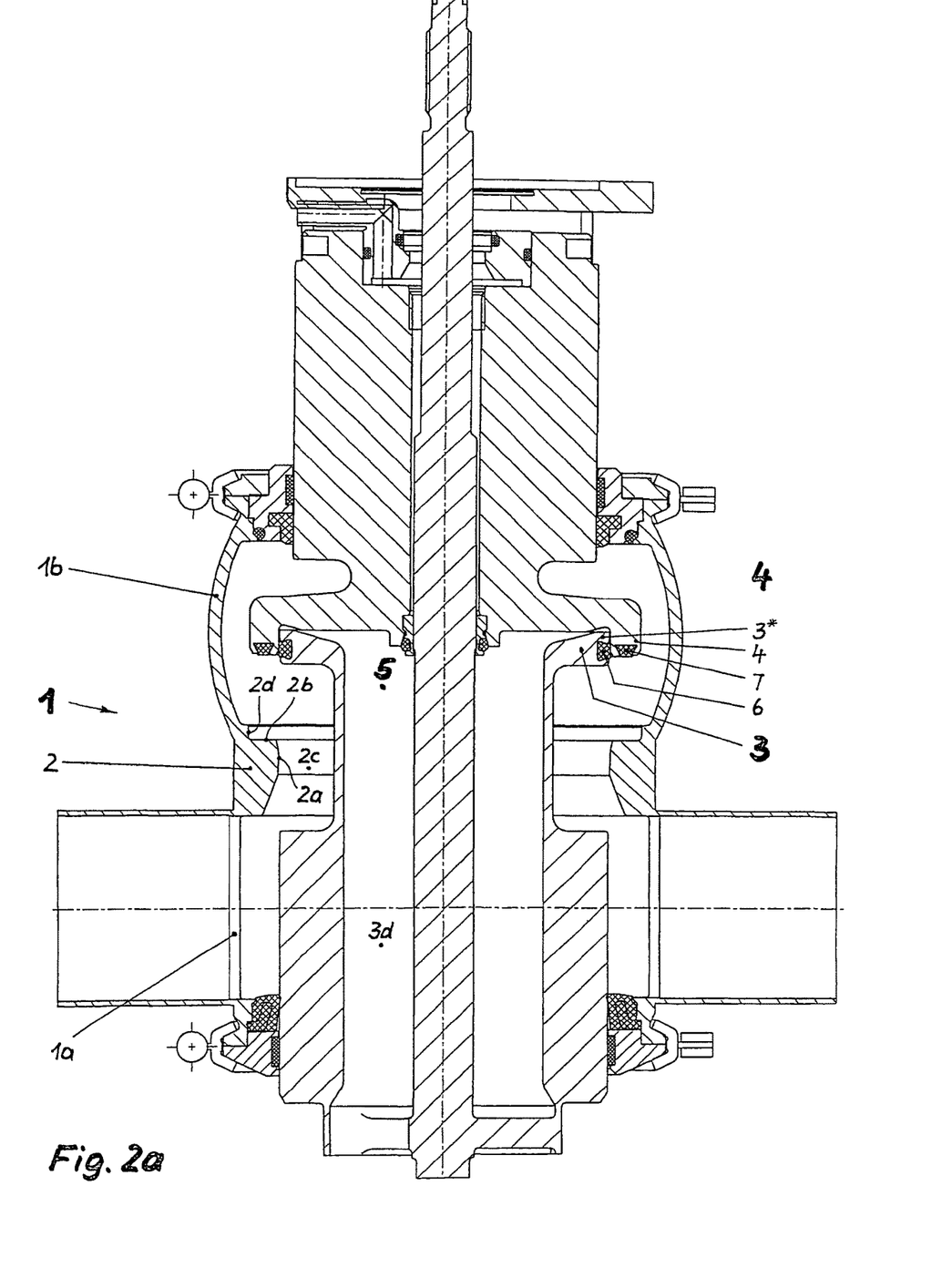
FIG. 2a shows in a longitudinal and vertical center section the double seat valve shown in FIG. 2 in its open position.

A second embodiment of the double seat valve 1 according to the invention is shown in FIG. 2 (closed position) and FIG. 2a (open position). The end section 3* provided on the first closing element 3 on the leakage space side is made in the form of a cylindrical first lug which with the associated section of the first seat surface 2a forms an annular first throttle gap D1 (see also FIG. 3). This first throttle gap D1 takes effect when the first closing element 3 is pushed down by the first partial lift T1 within the cylindrical first seat surface 2a so far that the first seal 6 detaches from the latter and the first seat cleaning flow R1 is routed out of the first valve housing part 1a and is fed into the leakage cavity 5.

The second closing element 4, relative to its second seal 7, radially outside has a cylindrical circumferential contour 4*, formed by the cylindrical external shape of the second closing element 4 which, with an annular cylindrical recess 2d in the connection opening 2c on the side of the second closing element 4, forms an annular second throttle gap D2 (FIG. 3). This second throttle gap D2 takes effect when the second closing element 4 is raised by the second partial lift T2 off the second seat surface 2b so that the second seat cleaning flow R2 is routed out of the second valve housing part 1b and fed into the leakage cavity 5.

FIG. 5a shows the integral welding part 30 which is formed from the shifting rod section 3a*, the three traverses 3e, and the ring 3g. The three traverses 3e which are arranged uniformly distributed over the circumference of the shifting rod section 3a* are connected securely to it. They are each connected radially outside likewise securely to the circumferential ring 3g. The welding part 30 on the outside is welded by way of the ring 3g to the pressure balance piston 3c (see FIG. 5b) which borders the section of the discharge bore 3d away from the leakage cavity and inside to the first shifting rod 3a by way of the shifting rod section 3a*. Here, the ring 3g in its inside diameter is enlarged relative to the diameter of the discharge bore 3d with the interposition of a conically widening transition region such that the inside passage of the discharge bore 3d is not narrowed by the traverses 3e.

REFERENCE NUMBER LIST OF THE
ABBREVIATIONS USED 1 double seat valve
10 valve housing
1a first valve housing part
1b second valve housing part
2 seat ring
2a first seat surface (cylindrical seat surface)
2b second seat surface (axial; axial/radial)
2c connection opening
2d annular recess
2g first end section (first inlet slope)
2g.1 first envelope of a cone
2g.2 second envelope of a cone
3 first closing element (slide piston)
3* end section (first cylindrical lug)
3a first shifting rod
3b connecting part
3c pressure balance piston
3d discharge bore
3d* connecting bore
3f chamfer
30 welding part
3a* shifting rod section
3e traverse
3g ring
4 second closing element
4* cylindrical circumferential contour
4a second shifting rod
4b recess
4c circumferential wall
4d deflection surface
4e front face 4f stop face (closing element-side)
4h second inlet slope
5 leakage cavity
6 first seal (radial)
7 second seal (axial; radial; axial/radial)
r1 first corner rounding (second closing element 4)
r2 radius of curvature (first inlet slope 2g; 2g.1; 2g.2)
r3 second corner rounding (housing-side; seat ring 2)
x axial safety distance
y axial undercutting distance
β second deflection angle
δ angle of pitch (of first inlet slope 2g)
$δ_1$ first angle of pitch (first conical section 2g.1)
$δ_2$ second angle of pitch (second conical section 2g.2)
ε first deflection angle
ζ angle of inclination
λ chamfer angle (of second inlet slope 4h)
D1 first throttle gap
D2 second throttle gap
H complete opening lift (completely open position)
K contour of deflection surface 4b
K1 first section (first straight line)
K2 second section (curved contour)
K3 third section (second straight line)
Kn last section
R1 first seat cleaning flow
R2 second seat cleaning flow
T1 first partial lift (first partially open position/first seat cleaning position
T2 second partial lift (second partially open position/second seat cleaning position
U1 first circumferential edge
U2 second circumferential edge

The invention claimed is:

1. A double seat valve, seats of which can be cleaned, with first and second closing elements (3, 4) arranged in series which can be moved relative to one another and which in the closed position of the double seat valve (1) prevent overflow of fluids from one valve housing part (1a; 1b) of a valve housing (10) into another (1b; 1a), which border between themselves, both in the closed and also in the open position, a leakage cavity (5) which is connected to the exterior of the double seat valve (1), in the closed position the first closing element (3) which is made as a slide piston being accommodated to form a seal in a connection opening (2c) which joins the valve housing parts (1a, 1b) to one another and in the course of its opening motion making sealing contact with the second closing element (4) which has a second seal (7) and which is associated with a second seat surface (2b), and the second closing element in the continued opening motion being likewise transferred into the open position (H), the first closing element (3) having a first seal (6) on an end section (3*) of the first closing element (3) which radially seals relative to a cylindrical first seat surface (2a) which is made in the connection opening (2c), the second closing element (4) on its end facing the first closing element (3) having a recess (4b) with a cylindrical circumferential wall (4c) which is flush with the cylindrical first seat surface (2a) and the recess (4b) being dimensioned in such a way as to accommodate the end section (3*) and the radial first seal (6) of the first closing element (3) to form a seal during the opening motion before the second closing element (4) opens, with closing elements (3, 4) which can be transferred independently of one another by a respective partial lift gap-wide into a seat cleaning position for purposes of flushing the seat surfaces (2a, 2b) being arranged coaxial relative to each other, the second closing element (4) by a second partial lift (T2) which acts in the same direction as the opening motion and the first closing element (3) by a first partial lift (T1) which acts in the direction opposite the opening motion travelling into its respective seat cleaning position, the second closing element (4) in its closed position with a stop face (4f) which forms a second circumferential edge (U2) with a circumferential wall (4c; 4h) adjoining the valve housing (10; 1a, 1b), and directly bordering the first seat surface (2a), the circumferential wall (4c) on its end facing away from the first closing element (3) undergoing transition into a rotationally symmetrical deflection surface (4d) and this deflection surface (4d) discharging in a front face (4e) of the recess (4b), which face is oriented perpendicular to the longitudinal axis of the second closing element (4) and, viewed in a vertical center section, the deflection surface (4d) having a contour (K) which runs without bends, and the direction vector at the discharge point of the deflection surface (4d) being oriented toward a center discharge bore (3d; 3d*) located in the first closing element (3) without colliding with the first closing element (3) in the area of its regions enclosing the leakage cavity (5) to form impact pressure, wherein the stop face (4f) is located on a boundary surface of the second closing element (4) which is adjacent radially to the inside to the second seal (7) and in the closed position of the second closing element (4) adjoins the second seat surface (2b), that the second closing element (4), relative to the second seal (7), radially outside has a cylindrical circumferential contour (4*), and that the circumferential contour (4*) with an annular cylindrical recess (2d) in the connection opening (2c) on the side of the second closing element (4) forms an annular second throttle gap (D2).

2. The double seat valve according to claim 1, wherein a front face boundary of the first closing element (3) which faces the leakage cavity (5) has an axial safety distance (x) from the direction vector at an exit point of the second seat surface (2b) made as a first circumferential edge (U1) into the first seat surface (2a).

3. The double seat valve according to claim 2, wherein the safety distance (x) is at least as large as the sum of all production tolerances of the components of the double seat valve (1) which in the closed position of the first closing element (3) determine its smallest axial distance to the second seat surface (2b).

4. The double seat valve according to claim 1, wherein the first circumferential edge (U1) which is formed by the second seat surface (2b) and the first seat surface (2a) is rounded with the smallest possible second corner rounding (r3).

5. The double seat valve according to claim 1, wherein the cylindrical circumferential wall (4c) ends in the second inlet slope (4h) to effect a smooth transition of the radial first seal (6) and the second inlet slope (4h) with the stop face (4f) forms the second circumferential edge (U2).

6. The double seat valve according to claim 1, wherein the second circumferential edge (U2) is rounded with the smallest possible first corner rounding (r1).

7. The double seat valve according to claim 1, wherein the deflection surface (4d) undercuts the front face (4e) by an axial undercutting distance (y).

8. The double seat valve according to claim 1, wherein the contour (K) consists of a sequence of curved segments (K1, K2, K3, ..., Kn) which at their respective transition sites each have a common tangent
or that the contour (K) consists of a single section of continuously altered curvatures
or that the contour (K) is formed from a single section with a constant curvature.

9. The double seat valve according to claim 1, wherein the direction vector of the last curved segment (Kn) relative to the front face (4e) has a second deflection angle (β) in the range $5 \leq \beta \leq 20$ degrees.

10. The double seat valve according to claim 1, wherein a discharge bore (3d) connects the leakage cavity (5) to the surroundings of the double seat valve (1) by way of several connecting bores (3d*) which are distributed over the periphery, and that a front-face boundary of the first closing element (3) which faces the leakage cavity (5) has a chamfer (3f) which declines toward a discharge bore (3d) circumferentially on all sides.

11. The double seat valve according to claim 1, wherein a discharge bore (3d) connects the leakage cavity (5) to the surroundings of the double seat valve (1), that a front-face boundary of the first closing element (3) which faces the leakage cavity (5) has a chamfer (3f) which declines toward the discharge bore (3d) circumferentially on all sides, and that a first shifting rod (3a) which is connected to the first closing element (3) concentrically penetrates a second shifting rod (4a) which is made as a hollow rod and which is connected to the second closing element (4), continues floating through the discharge bore (3d) and is connected on the end of the first closing element (3) facing away the second closing element (4) to the first closing element via at least one radially oriented traverse (3e).

12. The double seat valve according to claim 10, wherein chamfer (3f) is made as the envelope of a cone.

13. The double seat valve according to claim 12, wherein the envelope of a cone (3f) relative to the base surface of the cone is inclined by an angle of inclination (ζ) in the range $10 \leq \zeta \leq 20$ degrees.

14. The double seat valve according to claim 11, wherein there are three traverses (3e) which are arranged distributed uniformly over the circumference tightly on a shifting rod section (3a*), and which are connected each radially outside tightly to circumferential ring (3g) and that the shifting rod section (3a*), the crosspieces (3e) and the circumferential ring (3g) form an integral welding part (30).

15. The double seat valve according to claim 14, wherein the welding part (30) on the outside via the ring (3g) adjoins a pressure balance piston (3c) which borders the section of the discharge bore (3d) away from the leakage cavity, and on the inside adjoins the first shifting rod (3a) by way of the shifting rod section (3a*), and that the circumferential ring (3g) in its inside diameter is enlarged relative to the diameter of the discharge bore (3d) with the interposition of a conically widening transition region such that the inside passage of the discharge bore (3d) is not narrowed by the traverses (3e).

16. The double seat valve according to claim 1, wherein the second seat surface (2b) is made conical and that the second seal (7) seals axially/radially relative to the second seat surface (2b) in sliding/pressing engagement.

17. The double seat valve according to claim 1, wherein the second seat surface (2b) is perpendicular to the longitudinal axis of the double seat valve (1) and that the second seal (7) seals axially relative to the second seat surface (2b) in pressing engagement.

18. The double seat valve according to claim 1, wherein the end section (3*) provided on the first closing element (3) on the side of the leakage cavity is made in the form of a cylindrical lug which with the first seat surface (2a) forms an annular first throttle gap (D1).

19. The double seat valve according to claim 1, wherein the second closing element (4), relative to its second seal (7), radially outside has a cylindrical circumferential contour (4*), and that the circumferential contour (4*) forms an annular second throttle gap (D2) with an annular cylindrical recess (2d) in the connection opening (2c) on the side of the second closing element (4).

* * * * *